(12) United States Patent
Cartoni et al.

(10) Patent No.: US 7,654,494 B2
(45) Date of Patent: Feb. 2, 2010

(54) TRIPOD

(75) Inventors: Giudo Cartoni, Rome (IT); Raul Rodriguez, Rome (IT)

(73) Assignee: Cartoni SpA, Rome (IT)

( * ) Notice: Subject to any disclaimer, the term of this patent is extended or adjusted under 35 U.S.C. 154(b) by 43 days.

(21) Appl. No.: 11/872,792

(22) Filed: Oct. 16, 2007

(65) Prior Publication Data
US 2008/0111036 A1 May 15, 2008

(30) Foreign Application Priority Data
Nov. 13, 2006 (IT) .......................... RM2006A0613

(51) Int. Cl.
*F16M 11/32* (2006.01)
(52) U.S. Cl. .................................................. 248/163.1
(58) Field of Classification Search ............. 248/163.1, 248/166, 168, 169, 176.1, 188.5
See application file for complete search history.

(56) References Cited

U.S. PATENT DOCUMENTS

| | | | | |
|---|---|---|---|---|
| 4,640,482 A | * | 2/1987 | Rogers | 248/168 |
| 4,712,756 A | * | 12/1987 | Kester et al. | 248/165 |
| 4,832,296 A | * | 5/1989 | Schnepp | 248/168 |
| 4,840,338 A | * | 6/1989 | O'Connor | 248/168 |
| 5,667,175 A | * | 9/1997 | Brady | 248/166 |
| 5,887,835 A | * | 3/1999 | Hein et al. | 248/161 |
| 6,631,877 B1 | * | 10/2003 | Crain et al. | 248/168 |
| 6,702,482 B2 | * | 3/2004 | Sherwin | 396/428 |
| 2002/0153460 A1 | * | 10/2002 | Lindsay | 248/166 |
| 2004/0051010 A1 | * | 3/2004 | Blackburn | 248/163.1 |
| 2005/0017139 A1 | * | 1/2005 | Tacklind | 248/166 |

* cited by examiner

*Primary Examiner*—J. Allen Shriver, II
*Assistant Examiner*—Erin Smith
(74) *Attorney, Agent, or Firm*—Gauthier & Connors LLP

(57) ABSTRACT

The present invention relates to an improved tripod (1) having three legs (2) substantially at 120° each other, said legs being coupled above by a connection element (3) for fixing a camera or television camera, each leg being provided with three stages (2', 2", 2'''), movable telescopically each other, respectively a first stage (2') or upper stage, a second stage (2") or central stage and a third stage (2''') or lower stage, said first stage (2') being fixed above to said connection element (3) for fixing camera or television camera, being it possible positioning said legs (2) grouped centrally or spread out, said two positions being obtainable both with stages of the legs (2) collected and totally or partially extended, said tripod (1) being characterised in that a blocking/release lever (4) is provided on each leg (2), said lever (4) being provided in correspondence of the upper portion of the second stage (2"), said lever (4) being operable according to a substantially vertical direction and acting on blocking/release means between the first stage (2') and the second stage (2") and on blocking/release means between the second stage (2") and the third stage (2'''), being further provided tension rod means (8) between said lever (4) and said third stage (2'''), said tension rod means (8), actuated by said lever (4), interacting with said blocking/release means between the second stage (2") and the third stage (2'''), sliding each other between second stage (2") and third stage (2''') occurring only after the full opening of the second stage (2") with respect to the first stage (2').

4 Claims, 3 Drawing Sheets

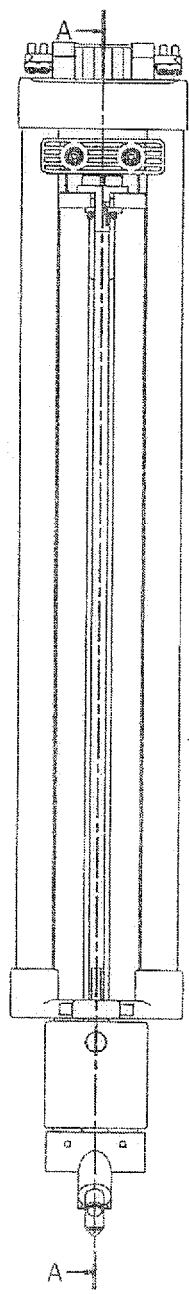
Fig. 4
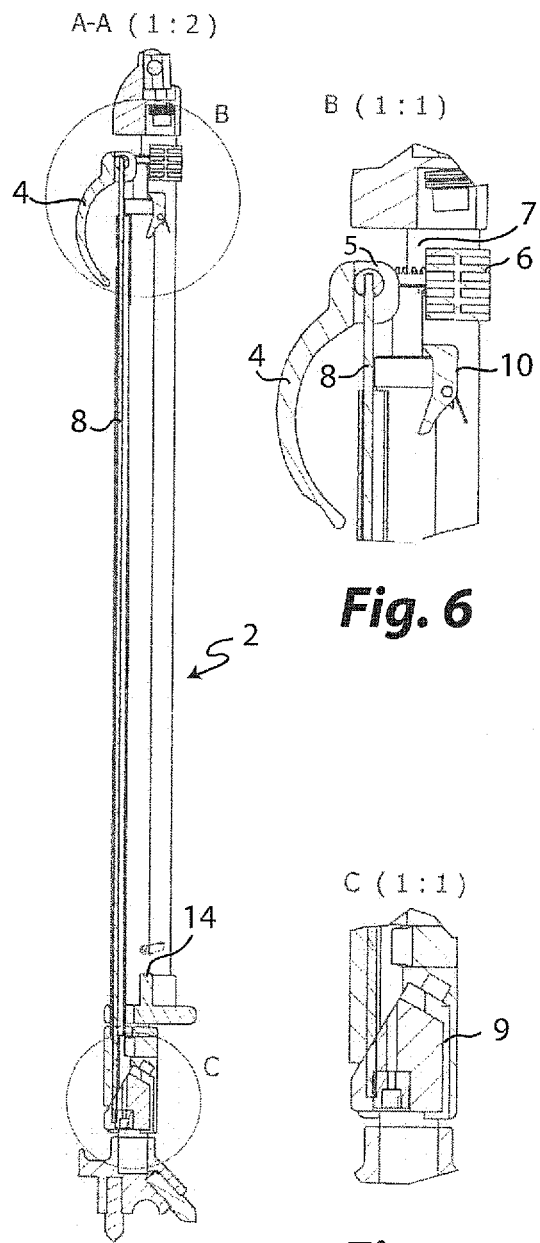
Fig. 5
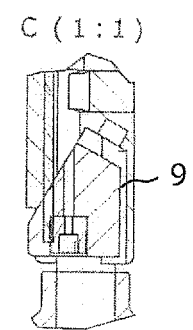
Fig. 6
Fig. 7

TRIPOD

PRIORITY INFORMATION

This application claims priority to Italian Patent Application No. RM2006A000613, filed on Nov. 13, 2006, all of which is incorporated herein in its entirety.

BACKGROUND OF THE INVENTION

1. Field of the Invention

The present invention relates to an improved tripod.

More specifically, the invention concerns a tripod, particularly studied for supporting television cameras and cameras, provided with a mechanism permitting a very easy and safe opening by a single movement.

2. Brief Description of the Art

Many different kinds of tripods have been realised during the last decades, to be used for supporting television cameras and cameras.

Among the known solutions, it is possible mentioning those realised by firms Sachtler, O'Connor, Baker, Sherwin and Manfrotto.

For example, a telescopic tripod is described in U.S. Pat. No. 5,887,835 assigned to Sachtler, said tripod providing a blocking lever that, by a lateral rotation action, permits obtaining releasing and blocking of mechanisms of the different stages of tripod.

Lateral movement of the blocking lever is not safe since it can be easily unintentionally actuated, for example by the interference of an electric cable. It further requires the use of rather complex mechanism for moving the different stages, requiring a difficult adjustment of the different sliding blocking elements.

Another example of known solution is that described in Sherwin, U.S. Pat. No. 6,702,482. the solution described provides a quick opening tripod with a plurality of blocking devices for each leg and for each stage. Said invention provides that blocking and releasing element for the different telescopic portions of each leg is comprised of a foldable retaining element connected with each leg. This element acts freeing telescopic sections when is displaced with respect to the leg and stops it when it reaches the horizontal position. Operation of these devices is simple, but it is bound to the perfect symmetry of the tripod opening; otherwise, the opening of only one leg is obtained, or stops of opening of the single legs with different heights.

In this context, it is included the solution suggested according to the present invention, permitting realising a tripod suitable to support television cameras and cameras, including at least three telescopic sections for each one of the three legs, said sections being actuated by a single fixing lever for each leg.

SUMMARY OF THE INVENTION

It is therefore a specific object of the present invention an improved tripod having three legs substantially at 120° each other, said legs being coupled above by a connection element for fixing a camera or television camera, each leg being provided with three stages, movable telescopically each other, respectively a first stage or upper stage, a second stage or central stage and a third stage or lower stage, said first stage being fixed above to said connection element for fixing a camera or television camera, being it possible positioning said grouped centrally or spread out, said two positions being obtainable both with stages of the legs collected and totally or partially extended, said tripod being characterised in that a blocking/release lever is provided on each leg, said lever being provided in correspondence of the upper portion of the second stage, said lever being operable according to a substantially vertical direction and acting on blocking/release means between the first stage and the second stage and on blocking/release means between the second stage and the third stage, being further provided tension rod means between said lever and said third stage, said tension rod means, actuated by said lever, interacting with said blocking/release means between the second stage and the third stage, sliding each other between second stage and third stage occurring only after the full opening of the second stage with respect to the first stage. Preferably, according to the invention, said blocking/release means between the first stage and the second stage comprise a wedge-shaped bracket, operably coupled with said actuation lever and acting by friction on the sliding elements of said second stage, wedge-shaped bracket being displaced by the action of said lever, removing friction coupling and releasing the second stage, thus freeing its sliding.

Particularly, a spring is provided between said lever and said wedge-shaped bracket, said spring keeping said wedge-shaped bracket normally pushing on said second stage.

Always according to the invention, said blocking/release means between the second stage and the third stage provide a wedge element, between said second stage and said third stage, displaced downward by the action of said tension rod, said tension rod being displaced by the action of said lever, a pin being provided between said second stage and said third stage, releasing their each other sliding only abutting against an abutment element, at the end of the opening run of said second stage with respect to said first stage.

Preferably, according to the invention, said lever has a covering shape.

BRIEF DESCRIPTION OF THE DRAWINGS

The present invention will be now described, for illustrative but not limitative purposes, according to its preferred embodiments, with particular reference to the figures of the enclosed drawings, wherein:

FIG. 4 is a front view of one of the three legs of tripod;

FIG. 5 is a section view taken along line A-A of FIG. 4;

FIG. 6 shows particular B of FIG. 5; and

FIG. 7 shows particular C of FIG. 5.

DETAILED DESCRIPTION OF THE INVENTION

Figure 1:
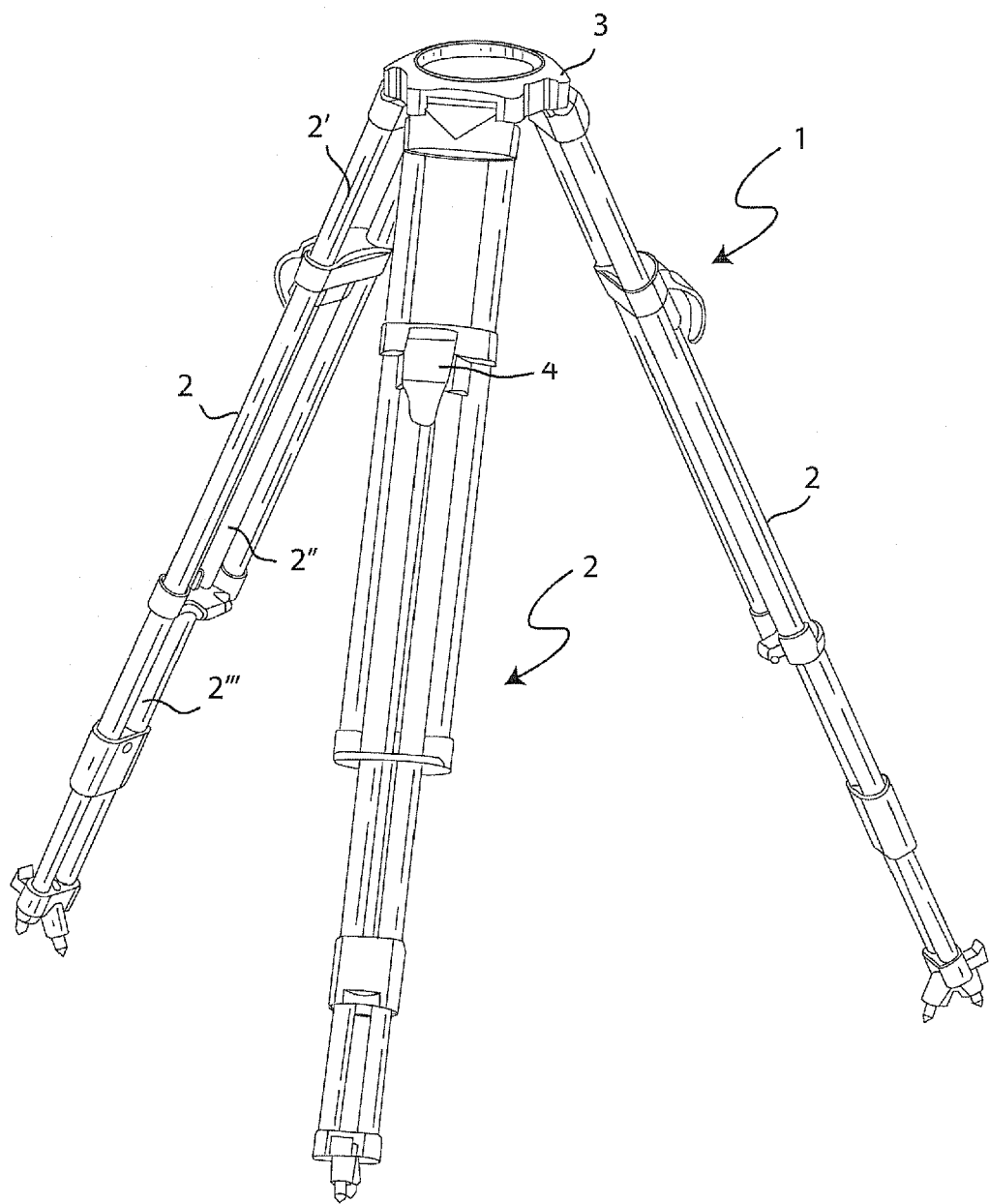
FIG. 1 is a perspective view of a tripod according to the invention.
Figure 3:
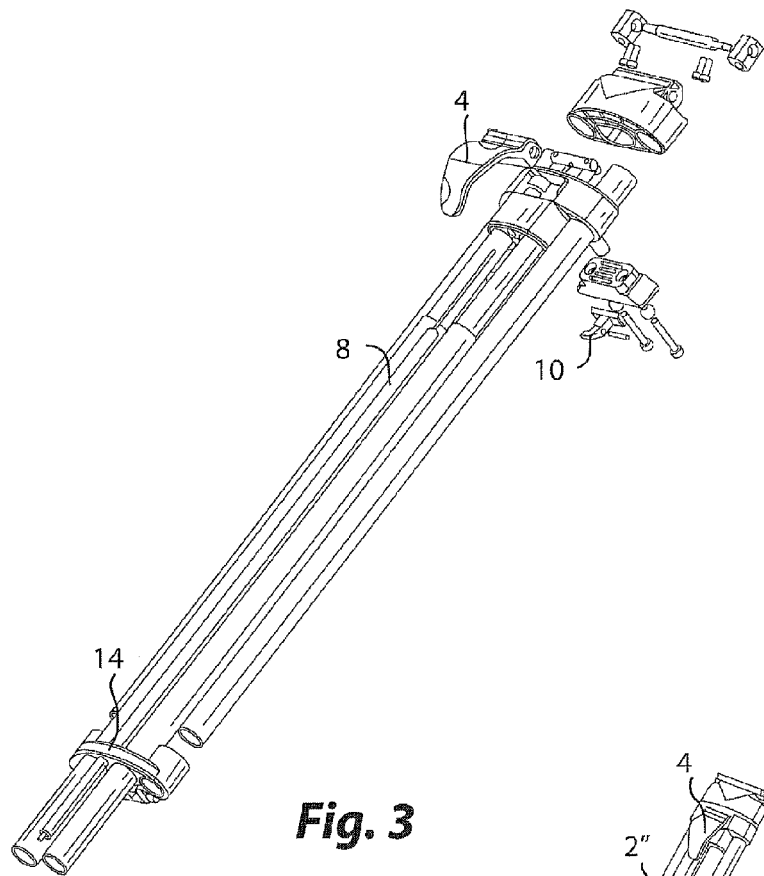
FIG. 3 is an exploded view of the leg of FIG. 2.
Figure 2:
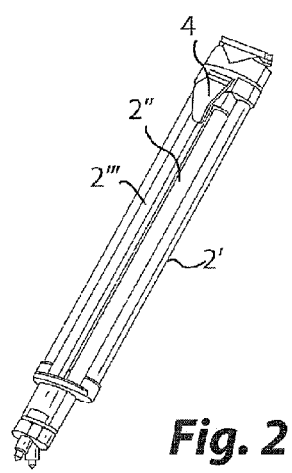
FIG. 2 is a perspective view of one of the legs of the tripod closed.

Coming now to observe figures of the enclosed drawings, and particularly FIG. 1, it is shown a tripod 1 according to the invention.

Innovative features of tripod 1 will be better evident from FIGS. 2-7.

Tripod 1 provides three legs 2, provided at 120° each other, that can be grouped in a vertical position, and that can be spread out as shown in FIG. 1, grouping and opening systems will be not described in greater detail since their are not specific object of the present invention.

The three tripod 1 legs 2 are structurally identical and thus only one of them will be described in the following, the same features being valid for the other legs.

Each leg 2 is comprised of three stages 2', 2'', 2'''. First stage 2' is fixed above to the connection element 3, while two stages 2'', 2''' are slidably coupled with first stage 2'.

A blocking lever 4 is provided on the upper portion of second stage 2'', rotatably acting along a vertical direction, and actuating telescopic displacement of the three telescopic sections of the leg 2 and thus permitting its lengthening and shortening.

This particular feature has the advantage of simplifying at most opening or folding of tripod 1, making it easy and quick installing and dismantling of tripod. Covering shape of lever 4 prevents its inadvertent actuation.

At the same time, tripod 1 according to the invention is light, ergonomic and very stable.

Structure of tripod is simple and cheap, permitting realising a product very efficient and easy to be used at a competitive price.

By the solution according to the present invention, it is thus obtained a tripod with a reduced number of components, permitting a great operative easiness, and a high performance reliability and ergonomy. Furthermore, solution suggested according to the present invention permits using cheap constructive technologies and materials, and requires a low and easy maintenance.

Specifically, in the embodiment shown in the enclosed figures, stage 2' has a fixing system with the tripod 1 upper base 3 (or connection element), two upper tubes, comprised of aluminium of carbon fibre, fixed and spaced each other, and a lower fixing.

Second stage 2'' passes through two holes of the lower fixing element, said second stage 2'' having a fixing system comprising the upper fixing, two intermediate tubes and a lower fixing element. Further, as already mentioned, stage 2'' comprises actuation lever 4, a fixing bracket, and a tension rod actuated by a rocking lever. Lever 4 has a double function since it releases and fixes two different fixing elements that will be described in greater detail in the following.

Stage 2''' has a fixing system comprised of two stop "mushrooms", two tubes inserted within tubes of stage 2'', and a lower fixing element having a push rod shape and resting on the ground.

Observing now particularly FIG. 6, it is shown the blocking and release system of the second stage 2''. Lever 4 provides an eccentric pin 5 actuating bracket 6. A contrast spring 7 is provided between pin 5 and bracket 6, aiming to bring bracket 6 always coupled with stage 2''.

Acting on lever 4, it is obtained displacement of bracket 6, thus freeing two tubes of stage 2'', with which it interacted by friction.

Tension rod 8 is further provided on lever 4, said tension rod 8, when acting on lever 4, lowers, thus lowering wedge 9 provided on stage 2'''.

Observing now also FIG. 7, it is observed that fixing system of stage 2''' is comprised of wedge 9, actuated by tension rod 8, and pin 10 (FIG. 6) that contacts and abuts with abutment element 14. thus, release of stage 2''' occurs by control of the sole lever 4, but only when stage 2'' has been completely elongated.

This feature of the two-tempi opening is particularly important since it confers a greater stability to tripod 1 according to the invention, since the last stage 2''' is interested by the action only when particular height needings require it, while during normal use of tripod it is rarely extended.

Tripod according to the present invention can be fully comprised of thermoplastic moulded parts and a very reduced number of machined components, thus being particularly economic.

Blocking of different sections is controlled by a single lever placed on the upper part of tripod and easily actuated by the user.

Furthermore, grasping of blocking elements of elongable legs is very efficient since it is based on eccentric element and on the wedge. Spring-assisted devices are self-adjusting in different moments and do not require maintenance.

Finally, particular release of third stage 2''' only after the full release of second stage 2'' ensures a greater stability.

The present invention has been described for illustrative but not limitative purposes, according to its preferred embodiments, but it is to be understood that modifications and/or changes can be introduced by those skilled in the art without departing from the relevant scope as defined in the enclosed claims.

We claim:

1. Improved tripod having three legs substantially at 120° each other, said legs being coupled above by a connection element for fixing a camera or television camera, each leg being provided with three stages, movable telescopically each other, respectively a first stage or upper stage, a second stage or central stage and a third stage or lower stage, said first stage being fixed above to said connection element for fixing a camera or television camera, being it possible positioning said legs grouped centrally or spread out, said two positions being obtainable both with stages of the legs collected and totally or partially extended, said tripod being characterised in that a blocking/release lever is provided on each leg, said lever being provided in correspondence of the upper portion of the second stage, said lever being operable according to a substantially vertical direction and acting on blocking/release means between the first stage and the second stage and on blocking/release means between the second stage and the third stage, being further provided tension rod means between said lever and said third stage, said tension rod means, actuated by said lever, interacting with said blocking/release means between the second stage and the third stage, sliding each other between second stage and third stage occurring only after the full opening of the second stage with respect to the first stage, wherein said blocking/release means between the first stage and the second stage comprise a wedge-shaped bracket, operably coupled with said actuation lever and acting by friction on the sliding elements of said second stage, wedge-shaped bracket being displaced by the action of said lever, removing friction coupling and releasing the second stage, thus freeing its sliding.

2. The tripod according to claim 1, wherein a spring is provided between said lever and said wedge-shaped bracket, said spring keeping said wedge-shaped bracket normally pushing on said second stage.

3. The tripod according to claim 1, wherein said blocking/release means between the second stage and the third stage provide a wedge element, between said second stage and said third stage, displaced downward by the action of said tension rod, said tension rod being displaced by the action of said lever, a pin being provided between said second stage and said third stage, releasing their sliding each other only abutting against an abutment element, at the end of the opening run of said second stage with respect to said first stage.

4. The tripod according to claim 1, wherein said lever has a covering shape.

* * * * *